(12) United States Patent
Zenere et al.

(10) Patent No.: US 11,072,118 B2
(45) Date of Patent: Jul. 27, 2021

(54) STEREOLITHOGRAPHY MACHINE WITH INCLINED TANK

(71) Applicant: DWS S.R.L., Thiene (IT)

(72) Inventors: Sergio Zenere, Carre' (IT); Renzo Busato, Marano Vicentino (IT)

(73) Assignee: DWS S.R.L., Thiene (IT)

( * ) Notice: Subject to any disclaimer, the term of this patent is extended or adjusted under 35 U.S.C. 154(b) by 159 days.

(21) Appl. No.: 16/469,965

(22) PCT Filed: Dec. 11, 2017

(86) PCT No.: PCT/IB2017/057789
§ 371 (c)(1),
(2) Date: Jun. 14, 2019

(87) PCT Pub. No.: WO2018/109636
PCT Pub. Date: Jun. 21, 2018

(65) Prior Publication Data
US 2020/0079019 A1 Mar. 12, 2020

(30) Foreign Application Priority Data

Dec. 16, 2016 (IT) .................. 102016000127377

(51) Int. Cl.
*B29C 64/124* (2017.01)
*B33Y 30/00* (2015.01)
(Continued)

(52) U.S. Cl.
CPC .......... *B29C 64/245* (2017.08); *B29C 64/124* (2017.08); *B29C 64/25* (2017.08);
(Continued)

(58) Field of Classification Search
CPC ........ B33Y 30/00; B29C 64/20; B29C 64/124
See application file for complete search history.

(56) References Cited

U.S. PATENT DOCUMENTS

| | | | | |
|---|---|---|---|---|
| 3,994,687 A | * | 11/1976 | Engelbrecht | ............ B01L 3/021 |
| | | | | 222/63 |
| 2009/0179355 A1 | * | 7/2009 | Wicker | .................. B33Y 10/00 |
| | | | | 264/401 |

(Continued)

FOREIGN PATENT DOCUMENTS

| DE | 10 2014 108633 | 12/2015 |
|---|---|---|
| EP | 2 835 251 | 2/2015 |
| WO | 2016172788 | 11/2016 |

OTHER PUBLICATIONS

Written Opinion regarding PCT/IB17/057789, dated Mar. 13, 2018 (9 pgs).

(Continued)

Primary Examiner — Joseph S Del Sole
Assistant Examiner — Jerzi H Moreno Hernandez
(74) Attorney, Agent, or Firm — Volpe Koenig

(57) ABSTRACT

A stereolithography machine includes a support structure arranged resting on a substantially horizontal support plane having a reference direction, a tank, having a bottom, coupled with the support structure, a support group coupled with the support structure for the movement above the tank of a modelling plate so that the modelling surface of the modelling plate faces the bottom in a substantially parallel position. The tank includes a recirculation circuit configured to move a photosensitive liquid substance contained in the tank from a first end to a second end of the tank, both defined along the reference direction, to carry out inside the tank a continuous recirculation of the resin that, by gravity, flows out from the first end at a greater height, to the second end at a lower height, and the same resin is returned by the recirculation circuit from the second end to the first end.

11 Claims, 11 Drawing Sheets

(51) Int. Cl.
- *B33Y 40/00* (2020.01)
- *B29C 64/245* (2017.01)
- *B29C 64/25* (2017.01)
- *B33Y 10/00* (2015.01)

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

| | | |
|---|---|---|
| 2014/0085620 A1 | 3/2014 | Lobovsky |
| 2015/0044318 A1* | 2/2015 | Ohkusa ................. B29C 64/264 425/174.4 |
| 2015/0115174 A1* | 4/2015 | Chen .................. G01N 15/1434 250/458.1 |
| 2015/0231824 A1* | 8/2015 | Kobayashi ............ B29C 70/545 264/401 |
| 2016/0046071 A1* | 2/2016 | Kuhnlein ............ B29C 67/0066 425/174.4 |
| 2017/0050389 A1* | 2/2017 | Lee ........................ B33Y 40/00 |
| 2017/0129167 A1* | 5/2017 | Castanon .............. B29C 64/124 |
| 2018/0200948 A1* | 7/2018 | Kuijpers ................ B29C 64/124 |
| 2020/0391438 A1* | 12/2020 | Costabeber ........... B29C 64/264 |

OTHER PUBLICATIONS

International Search Report regarding PCT/IB17/057789, dated Mar. 13, 2018 (7 pgs).

\* cited by examiner

STEREOLITHOGRAPHY MACHINE WITH INCLINED TANK

FIELD OF THE INVENTION

The present invention concerns a stereolithography machine that makes it possible to speed up and simplify the stereolithography processes for producing three-dimensional objects, in particular the stereolithography processes for producing three-dimensional objects that require the variation of the pigmentation of the photosensitive liquid substance during the production of the same object.

BACKGROUND

As known, a stereolithography machine is used for producing complex three-dimensional objects from a photosensitive liquid substance, preferably a photosensitive resin, which is made to polymerize in layers through a light beam. In order to simplify the description, hereinafter the term "resin" will simply be used to mean a photosensitive resin or any other photosensitive liquid substance equivalent to a photosensitive resin used in a stereolithography process for producing three-dimensional objects.

It is also known that a stereolithography machine comprises a tank adapted for containing the aforementioned resin and a modelling plate facing, in a substantially parallel position, the bottom of the tank and that supports the three-dimensional object in formation. The modelling plate is associated with a support group for moving the same plate according to a movement direction substantially orthogonal to the bottom of the tank. In order to make each layer of the object, the surface of the previous layer, or the modelling surface of the modelling plate in the case in which it concerns the first layer, are immersed in the resin until they are arranged at a distance from the bottom of the tank equal to the thickness of the layer to be made, so as to define a corresponding layer of liquid resin. Thereafter, the aforementioned layer of resin is polymerized through irradiation with a light beam coming from the lower part of the tank, which for this purpose has the bottom transparent.

In particular, between the polymerization steps of one layer and the next one the stereolithography method provides to take the modelling plate away from the bottom so as to make the solidified layer emerge from the liquid resin and thus allow the restoration of the thickness of liquid resin necessary for the processing of the subsequent layer.

Indeed, the lifting of the modelling plate and of the solidified layer leaves a depression in the liquid resin, which is filled by the spontaneous outflow of the resin itself.

The aforementioned levelling restores the thickness of liquid resin necessary for the solidification of a new layer of the object and also prevents, during the subsequent lowering of the modelling plate, air bubbles that could jeopardize the integrity of the subsequent layer of the three-dimensional object from being able to remain trapped in the liquid resin.

At the end of the aforementioned spontaneous levelling, the modelling plate, as already stated, is again immersed in the liquid resin and a further layer of the object is then solidified.

The method described above has the drawback that the overall processing time of the three-dimensional object is substantially lengthened by the waiting times for the levelling of the liquid resin, which occur after the solidification of each layer of the object.

Since the number of layers that form an object obtained through stereolithography can be many hundreds, it can be understood that the aforementioned waiting times result in a substantial increase in the machining time.

Clearly, the waiting times are proportional to the viscosity of the liquid resin.

In order to overcome such a drawback, stereolithography machines are known that comprise levelling means, preferably a spatula, configured to intervene when the modelling plate is lifted in order to push the resin towards the depression.

In particular, the aforementioned levelling means are associated with motorization means configured to move the first with respect to the bottom of the tank in contact with the resin so as to indeed redistribute it and level its upper surface.

It is clear that such an operation makes it possible to fill the aforementioned depression more quickly with respect to the spontaneous redistribution of the resin described earlier and consequently the overall machining times for making a three-dimensional object are reduced with respect to stereolithography machines without the aforementioned levelling means.

However, such a last solution of the prior art provides greater complexity of the structure of the same stereolithography machine since it is necessary to provide an additional element and the relative movement system with respect to the stereolithography machines described earlier. Moreover, disadvantageously, it is known that the aforementioned levelling means intervene only after the lifting of the modelling plate to a sufficient height to allow the same levelling means to slide through the space defined between the plate and the tank below. Therefore, although the stereolithography machines comprising the aforementioned levelling means make it possible to reduce the production times of three-dimensional objects with respect to stereolithography machines that do not have them, the precise sequence of operations described above in any case, disadvantageously, results in non-negligible processing times.

Documents EP 2 835 251 A1, US 2014/085620 A1, WO 2016/172788 A1 and DE102014108633 all describe a stereolithography system for producing a three-dimensional object through solidification in layers of a liquid resin.

The present invention aims to overcome all of the drawbacks described above belonging to the prior art.

SUMMARY

In particular, a purpose of the invention is to make a stereolithography machine that makes it possible to produce a three-dimensional object through solidification in layers of a liquid resin more quickly with respect to stereolithography machines of the prior art, for the same structural complexity of some types of stereolithography machines of the prior art.

At the same time, a further purpose of the invention is to make a stereolithography machine that has a simpler structure with respect to some types of stereolithography machines of the prior art, for the same processing times required for producing the same three-dimensional object.

A further purpose of the invention is to make a stereolithography machine that makes it possible to use a lower amount of resin with respect to the amount of resin required through the use of stereolithography machines of the prior art.

The aforementioned purposes are accomplished by a stereolithography machine for producing a three-dimensional object in layers according to claim 1.

Further detailed characteristics of the invention are given in the relative dependent claims.

Advantageously, the stereolithography machine of the invention makes it possible to carry out the recirculation of the resin arranged inside the tank. Consequently, again advantageously, the stereolithography machine of the invention makes it possible to quickly and progressively vary the pigmentation of the resin, introducing, in successive moments, pigments with different gradations or resins of different color that will be mixed and amalgamated quickly and homogeneously with the resin already present in the tank. In this way, therefore, with the stereolithography machine of the invention it is possible to produce three-dimensional objects with layers of different pigmentation in a quick and simple manner, where each layer has a homogeneous pigmentation.

A further advantage of the stereolithography machine of the invention is given by the fact that with such a recirculation function of the resin inside the tank it is possible to carry out a cleaning operation thereof between one stereolithography process and the next, without the need for the intervention of an operator.

The last but not least advantage of the embodiment of the stereolithography machine of the invention is due to the fact that it is possible to quickly and easily recover the resin present inside the tank at the end of a stereolithography process for producing a three-dimensional object, in order to re-use such recovered resin in a subsequent stereolithography process.

BRIEF DESCRIPTION OF THE DRAWINGS

Said purposes and the aforementioned advantages, together with others that will be mentioned hereinafter, will be highlighted during the description of some preferred embodiments of the invention that are given by way of non-limiting example with reference to the following tables of drawings, where.

DETAILED DESCRIPTION OF THE PREFERRED EMBODIMENTS

Figure 1:
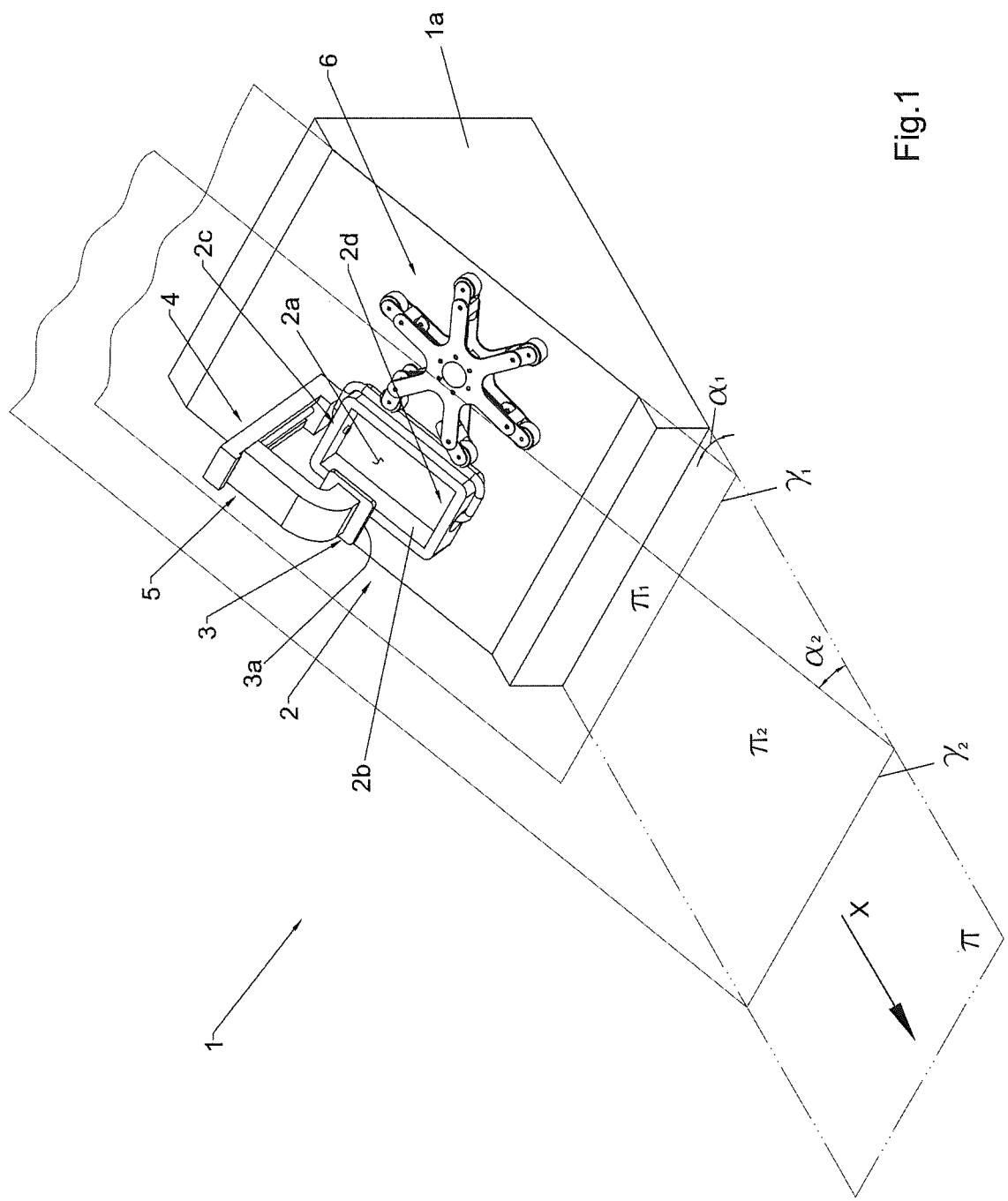
FIG. 1 represents a schematized axonometric view of a first embodiment of the stereolithography machine of the invention.
Figure 2:
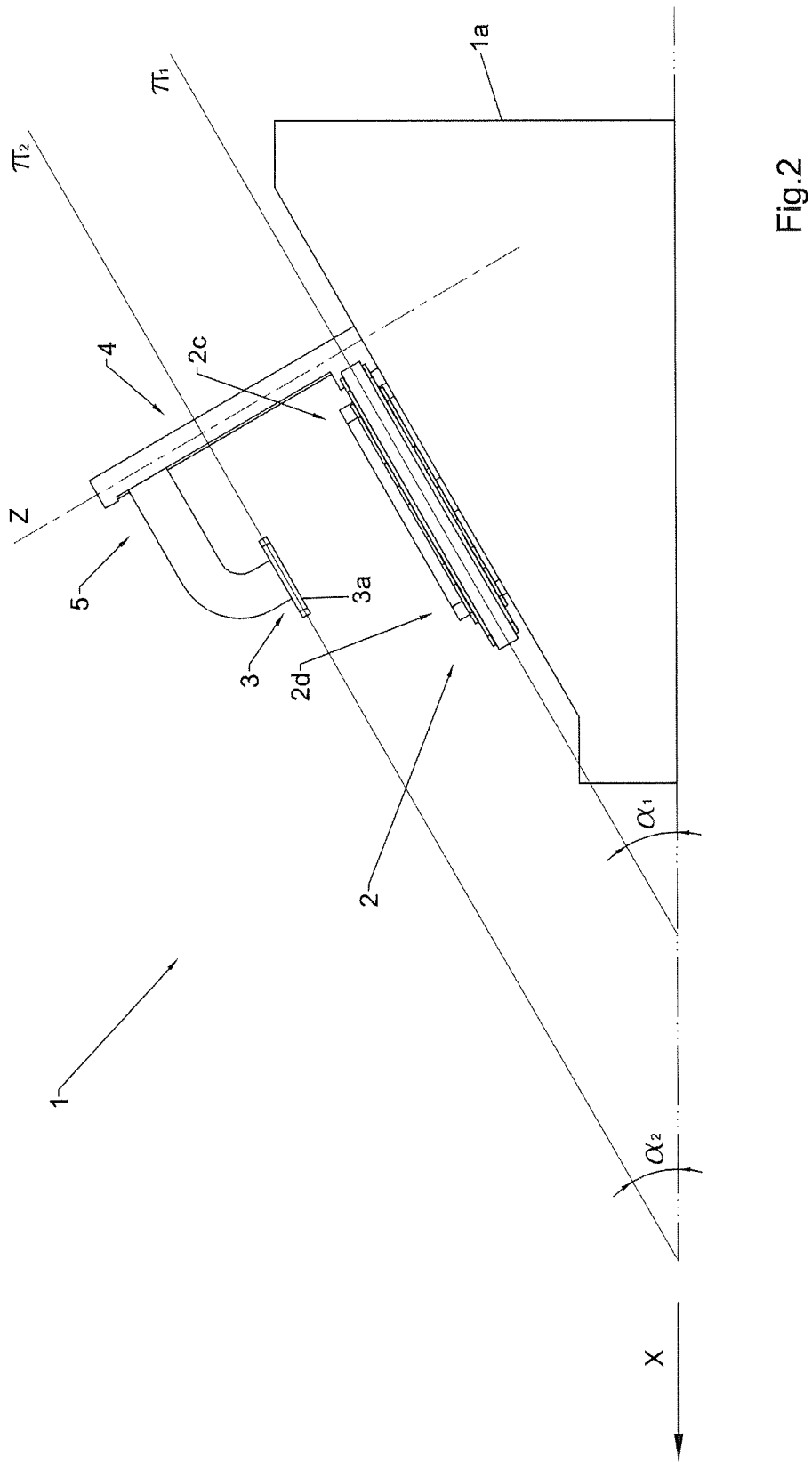
FIG. 2 represents the schematized side view of the first embodiment of the stereolithography machine of the invention.

The stereolithography machine of the invention, according to a first preferred embodiment, is represented in FIGS. 1 and 2, where it is wholly indicated with 1.

As can be seen in such figures, the stereolithography machine 1 comprises a support structure 1*a* adapted for being placed resting on a substantially horizontal support plane π, like for example the upper surface of a laboratory bench. As will be made clear hereinafter, a reference direction X, defined more precisely in the rest of the present description, is identified on the aforementioned support plane π.

Such a support structure 1*a* is configured to support a tank 2 in turn provided with a bottom 2*a* and with side walls 2*b* so as to contain a photosensitive liquid substance, preferably a photosensitive resin.

The bottom 2*a* is transparent so as to allow the passage of a light beam coming from a source, not represented in the figures but per se known, arranged below the tank 2. Such a light beam is adapted clearly for selectively solidifying a layer of the resin arranged adjacent to the bottom 2*a* itself.

There is also a modelling plate 3 provided with a modelling surface 3*a* facing, substantially in a parallel position, the bottom 2*a*, above the tank 2, as can be seen in FIG. 2.

The modelling surface 3*a* is used to support the first layer of the three-dimensional object that is solidified, which in turn acts as a support for a second layer, and so on for the next ones.

The modelling plate 3 is supported by a support group 5, in turn associated with the support structure 1*a* through movement means 4 for the movement of the same support group 5 and, consequently, of the plate 3, according to a movement direction Z orthogonal to the bottom 2*a*, as indicated in FIG. 2.

Preferably but not necessarily, the movement means 4 comprise a servomotor, for example of the stepper type, not represented in the figures.

Preferably, the aforementioned servomotor actuates a worm screw, also not represented in the figures, in turn operatively associated with the support group 5.

The movement means 4 thus allow the movement of the modelling plate 3 according to the movement direction Z so as to arrange the modelling surface 3*a*, or the surface of the last solidified layer of the object, immersed in the resin at a distance from the bottom 2*a* corresponding to the thickness of the subsequent layer to be made.

According to the invention, the stereolithography machine 1 of the invention provides, at least during the actual stereolithography process for producing a three-dimensional object, that the tank 2, the support group 5 and the modelling plate 3 are coupled with the support structure 1*a* so that the bottom 2*a* and the modeling surface 3*a* lie respectively on a plane plane π1 and a π2 both intersecting the aforementioned support plane π defining with this latter angles of intersection α1 and α2 and defining with the same support plane π lines of intersection y1 and y2 orthogonal to the aforementioned reference direction X, as clearly represented in FIGS. 1 and 2.

Incidentally, the expression "stereolithography process for producing a three-dimensional object" is meant to indicate the whole of the operative steps carried out for the selective solidification of the resin for each of the layers that make up the aforementioned object.

Basically, going back to the inventive concept of the present invention, the stereolithography machine 1 provides that the bottom 2*a* of the tank 2 and the modelling surface 3*a* belonging to the modelling plate 3 are arranged inclined with angles of intersection α1 and α2, with respect to the support plane π, at least during the execution of the aforementioned stereolithography process.

Such a provision makes it possible to obtain numerous advantages with respect to the production of three-dimensional objects carried out through the stereolithography machines of the prior art that instead have the bottom of the tank and, jointly, the modelling surface arranged in substantially horizontal position, parallel to the support plane π.

Firstly, the inclined arrangement of the bottom 2*a* with respect to the support plane π makes it possible to exploit the force of gravity for the outflow of the resin introduced at a first end 2*c* of the tank 2 defined at a distal position with respect to the aforementioned line of intersection y1, thus arranged at a greater height, towards the second end 2*d* of the same tank 2 defined close to such a line of intersection y1, thus at a lower height, indeed taking the support plane π as reference, as schematically represented in FIG. 2. Clearly, as can be seen in the aforementioned FIG. 2, the two ends 2*c* and 2*d* of the tank 2 are defined one after another according to the aforementioned reference direction X.

The solution of the invention thus advantageously makes it possible to quickly fill the depression that is created following the lifting of the modelling plate 3 at the end of making a layer, as described earlier, even if the stereolithography machine 1 does not have the aforementioned levelling means. Moreover, the outflow by gravity of the resin takes comparable if not shorter times than what is required by the levelling operation through the aforementioned levelling means.

Figure 3:
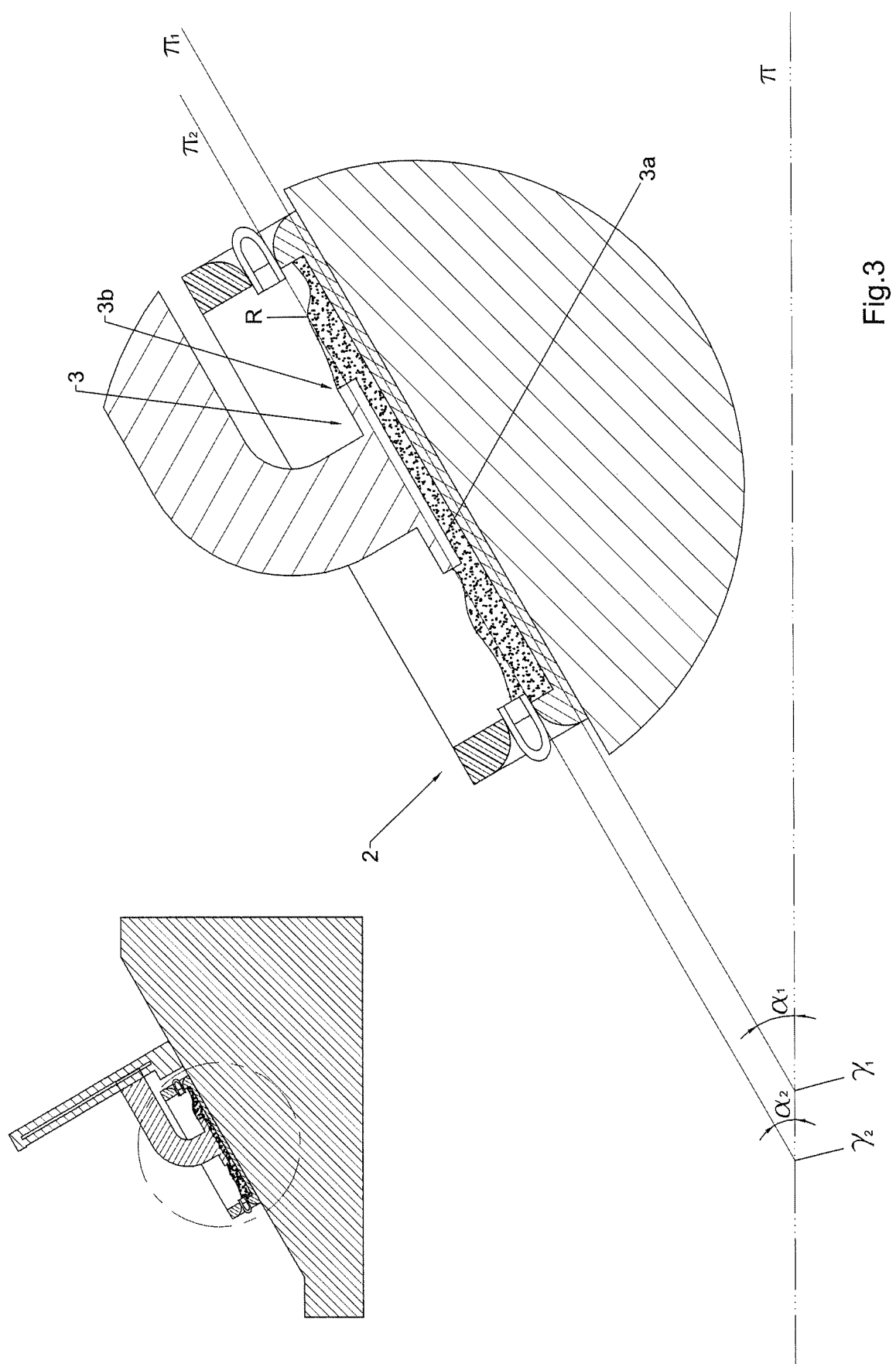
FIG. 3 represents a detail in section of the tank and of the modelling plate belonging to the stereolithography machine of the invention according to FIGS. 1 and 2.

Concerning this, indeed, at the moment when the modelling plate 3 is in lowered position and immersed in the resin during the making of a layer of the three-dimensional object, the same resin R, present at the first end 2*c* of the tank 2, by gravity tends to fall and impact, accumulating, at the upper edge 3*b* of the modelling plate 3, as schematically represented in FIG. 3. Such a situation is kept stable while the modelling plate 3 remains lowered during the making of a specific layer of the object. Following the lifting of the modelling plate 3, at the end of the making of such a layer, and, consequently, after determining the aforementioned depression, advantageously, the resin that has accumulated at the upper end 3*b* of the same modelling plate 3 is immediately capable of flowing downwards by gravity and quickly filling the depression that had previously formed.

According to the aforementioned first preferred embodiment of the invention, the tank 2, the support group 5 and the modelling plate 3 are coupled with the support structure 1*a* so that the value of the aforementioned angles of intersection α1 and α2 defined by the intersection of the two intersecting planes 71 and 72 with the support plane π is predetermined and remains unchanged both during the actual stereolithography process and in the rest condition of the stereolithography machine 1.

In the present context, the expression "rest condition of the stereolithography machine" means both the situation in which the stereolithography machine is deactivated and the situation in which the stereolithography machine is in a configuration and setting condition.

In other words, the aforementioned first preferred embodiment of the invention provides that the tank 2, the support group 5 and the modelling plate 3 can provide as single coupling arrangement with respect to the support structure 1*a* that described just above, of course apart from the possibility of the support group 5 and of the modelling plate 3 moving along the aforementioned movement direction Z through the movement means 4.

Preferably but not necessarily, the value of the angles of intersection α1 and α2 is selected in the range between $\frac{1}{8}\pi$ rad and $\frac{3}{8}\pi$ rad, preferably around $\pi/4$ rad.

Hereinafter a further preferred embodiment of the invention will be described that provides an alternative solution to such a predetermined and invariable arrangement of the components that define the stereolithography machine 1 of the invention.

Going back to the preferred embodiment of the invention, preferably but not necessarily, it provides that the tank 2 is provided with a recirculation circuit 6 configured to move the resin contained in the same tank 2 from a first end 2*c* (or alternatively 2*d*) thereof to a second end 2*d* (or alternatively 2*c*) of the same tank 2, both defined along the reference direction X.

Three particular alternative forms of the recirculation circuit 6 present in the stereolithography machine 1 of the invention are schematically represented in FIGS. 4 to 9 and will be described in detail hereinafter.

Deliberately, with what is expressed two paragraphs above it is meant that the recirculation circuit 6 is not exclusively capable of circulating the resin according to a single direction of circulation, but it alternatively has the possibility of carrying out the recirculation of the resin according to both directions of circulation, irrespective of the mutual height of the two ends 2*c* and 2*d* of the tank 2, again taking the support plane π as reference.

However, according to the preferred embodiment of the invention, the aforementioned recirculation circuit 6 must be configured at least to move the resin from the end 2*d* defined close to the line of intersection y1 and thus at a lower height than the end 2*c* in distal proximity with respect to the aforementioned line of intersection y1 and thus at a greater height, as represented schematically in FIG. 2.

Indeed, this makes it possible, during the stereolithography process, to carry out a continuous recirculation of the resin inside the tank 2 that, by gravity, flows out from the distal end 2*c* with respect to the aforementioned line of intersection y1, therefore at a greater height, to the end 2*d* close to the aforementioned line of intersection y1, thus at a lower height, and, through the effect of the recirculation circuit 6, the same resin is again brought from the aforementioned lower end 2*d* to the upper end 2*c*.

Consequently, advantageously, the aforementioned direction of recirculation makes it possible to obtain, during the stereolithography process, a quick and constant mixing of the resin, also in the case of addition into the same resin of pigments of different color or resins of different color with respect to the pigments already present in it.

This, advantageously, makes it possible to carry out the variation of the coloring of the resin between one layer and the other of the three-dimensional object in production and, at the same time, makes it possible to produce every single layer with a resin that is homogeneous in color and in viscosity along the entire surface extension of the layer itself.

Moreover, the continuous circulation of the resin inside the tank 2 contributes to reducing the amount of resin necessary to make every single layer. Such an amount of resin is certainly less than what is required by the use of stereolithography machines with bottom and modelling surface arranged substantially horizontal.

Indeed, in this last case it is necessary to arrange inside the tank an amount of resin even many times greater with respect to what is actually required to make a layer of the object, since such an increase is necessary to obtain an adequate levelling of the same resin either naturally or with the help of the aforementioned levelling means, as described during the description of the prior art.

Furthermore, as stated earlier, the recirculation circuit 6 could be exploited, between one stereolithography process and the next, to continuously circulate a solvent or similar inside the tank 2 to carry out the cleaning of the tank 2 itself.

Finally, again advantageously, the recirculation circuit 6 provided with a suitable flow deviator element, not represented in the figures, could be used to recover the resin present in the tank 2 at the end of a stereolithography process. Such resin could therefore be stored in the suitable cartridge automatically and re-used in a subsequent stereolithography process.

Figure 4:
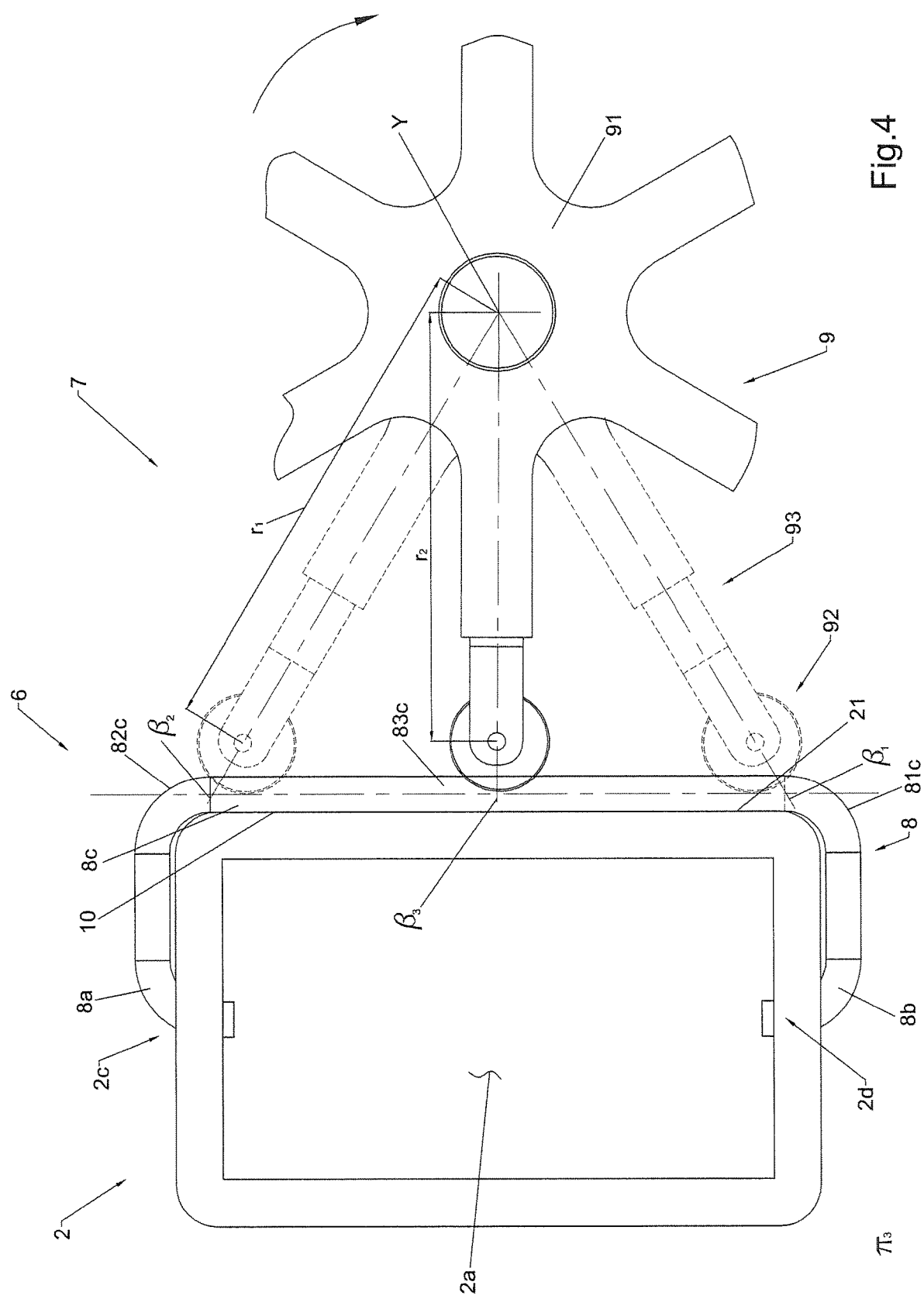
FIG. 4 represents the schematized view from above of a first embodiment of the recirculation circuit provided in the stereolithography machine of the invention according to FIGS. 1 and 2; the figure represents the rotor belonging to the recirculation circuit having a contrast element arranged ideally in different positions with respect to the duct through which the resin flows.

According to a first embodiment of the invention, as can be seen in FIG. 4, the recirculation circuit 6 is implemented as a peristaltic pump 7, therefore comprising a duct of deformable material 8 arranged outside of the tank 2 and having a first mouth 8a in fluid-dynamic communication with a first end 2c of the tank 2 and the second mouth 8b in fluid-dynamic communication with the second end 2d of the tank 2. Between such first and second mouths 8a and 8b of the duct 8 a segment 8c is defined arranged close to a contrast wall 10.

Moreover, the aforementioned peristaltic pump 7 comprises a rotor 9 provided with a main body 91 at the center of which a rotation axis Y is defined and at the periphery of which at least one contrast element 92, preferably a roller, coupled. Such at least one contrast element 92 is able to touch and throttle the segment 8c of the duct 8 on the opposite side with respect to the contrast wall 10, for a certain angular range β during the rotation of said rotor 9, as represented in FIG. 4. In this way, the collaboration of the contrast element 92 with the contrast wall 10 determines the throttling of the segment 8c determining, according to the principle of peristalsis, the pushing of the resin in a certain direction of circulation based on the direction of rotation of the rotor 9 itself.

Figure 7:
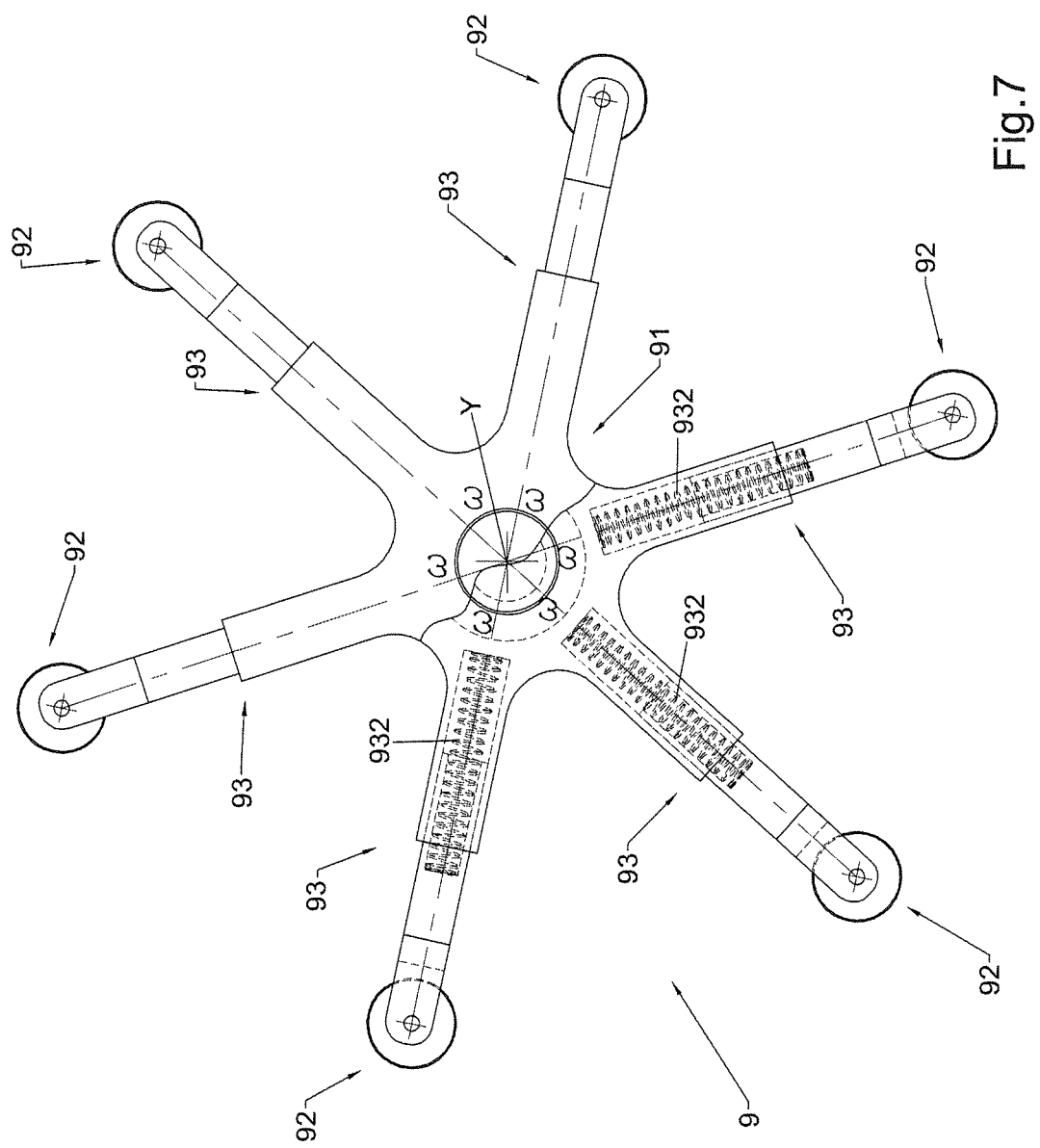
FIG. 7 represents a view from above of the detail of the rotor belonging to the recirculation circuit represented in FIG. 4.

According to the preferred embodiment of the invention, the rotor 9 is provided with six contrast elements 92 arranged at the periphery of the main body 91 and each of which is spaced from the contrast elements 92 adjacent to it at the same predetermined angular distance ω. In particular, the angular distance ω between one contrast element 92 and those adjacent to it is selected to be equal to π/3 rad, as represented in FIG. 7.

Furthermore, preferably but not necessarily, the rotor 9 is operatively associated with the stereolithography machine 1 so that the aforementioned rotation axis Y is defined substantially orthogonal to the lying plane π3 of the duct 8 so that each of the contrast elements 92 touches and progressively throttles the segment 8c for the entire aforementioned angular range β during the rotation of the rotor 9 itself. According to the aforementioned first preferred embodiment of the stereolithography machine 1 of the invention, the lying plane π3 substantially corresponds to or, at least, is parallel to the intersecting plane 71 on which the bottom 2a lies.

However, this does not rule out the possibility that according to variant embodiments alternative to the first embodiment of the invention described up to here the number of contrast elements 92 is more or less than six, that the angular distances ω between the various adjacent angular elements 92 are defined as different to one another and/or that the rotation axis Y of the rotor 9 is not substantially orthogonal to the lying plane π3 of the duct 8.

Going back to the aforementioned first preferred embodiment of the invention, as can be seen in FIG. 4, it provides that the segment 8c of the duct 8 and the contrast wall 10 have a substantially rectilinear development in a position parallel and adjacent to one another. In particular, as can be seen in FIG. 4, according to the preferred embodiment of the invention, the aforementioned contrast wall 10 corresponds to an outer wall 21 of the tank 2.

Consequently, the rotor 9 comprises a mechanical group 93 arranged between the main body 91 and each of the contrast elements 92. In particular, every mechanical group 93 is configured to allow the variation of the radial distance r between the relative contrast element 92 and the same main body 91 so as to allow the aforementioned contrast element 92 to touch and progressively throttle the rectilinear segment 8c for the entire angular range 13, during the rotation of the rotor 9.

In other words, the rotor 9, according to the invention, must be arranged at a distance from the duct 8 so that each of the aforementioned mechanical groups 93 is capable of arranging the relative contrast element 92, substantially at both of the ends β1 and β2 of the aforementioned angular range β, at a first radial distance r1 from the main body 91 in order to allow the same contrast element 92 to touch the ends 81c and 82c of the aforementioned rectilinear segment 8c. Moreover, the mechanical group 93 must be capable of arranging the relative contrast element 92, at the central position β3 of the angular range β, at a second radial distance r2 from the main body 91 in order to allow the same contrast element 92 to also touch the central part 83c of the aforementioned rectilinear segment 8c. Therefore, the aforementioned configuration of the mechanical group 93 in combination with the position of the rotor 9 in the stereolithography machine 1 and, in particular with respect to the segment 8c of the duct 8, makes it possible to continuously and progressively throttle, with the collaboration of the contrast wall 10, the entire rectilinear segment 8c. This, as already stated, allows the resin to be given a flowing direction along the duct 8, based on the direction of rotation of the rotor 9.

Such a last solution advantageously makes it possible to simplify the structure of the recirculation circuit 6, in particular, of the peristaltic pump 7 with respect to known peristaltic pumps, for which it is provided that the aforementioned segment of the duct be a curved segment arranged coaxially and outside of a rotor peripherally to which a plurality of contrast elements is arranged statically.

The particular solution proposed by the invention, again advantageously, makes it possible to exploit as contrast wall 10 an outer wall 21 of the tank 2, thus allowing the duct 8 to be incorporated in the same tank 2.

Furthermore, such an embodiment makes it possible to make the duct 8 and the rotor 9 structurally independent and therefore easily detachable. This is advantageous when thinking of making a stereolithography machine 1 with interchangeable tank 2, which is therefore extractable and insertable in a suitable housing defined in the machine itself. Indeed, the fact that the duct 8 is independent and detached from the rotor 9 makes it possible to make the latter fixedly connected to the stereolithography machine 1 and only when the tank 2 is inserted in the aforementioned housing the same rotor 9 is capable of collaborating with the duct 8 incorporated in the tank 2 itself.

Incidentally, finally, it is important to highlight that the solution of the peristaltic pump 7 just proposed, including the particular implementations described hereinafter, could be per se object of a claim without the need for such solutions to be implemented in a stereolithography machine 1 according to the preferred embodiment of the invention or according to the alternative embodiments described earlier. Indeed, such a last solution of peristaltic pump 7 makes it per se possible to obtain the advantages just outlined.

As just stated, even more specifically, according to the first embodiment of the invention, as schematically represented in FIG. 7, each mechanical group 93 comprises a telescopic arm 931 arranged between the main body 91 and the relative contrast element 92.

Moreover, the mechanical group 93 comprises elastic means 932, preferably a spring, configured so that, in rest condition, it keeps the telescopic arm 931 in the position of maximum extension. The expression "rest condition" referring to the mechanical group 93, is meant to indicate the condition in which the thrust exerted by the elastic means 932 is not obstructed by any external force.

This thus makes it possible, as represented in FIG. 4, to arrange the contrast element 92 at the aforementioned first radial distance r1 when the same contrast element 92 is at the ends β1 or β2 of the aforementioned angular range β during the rotation of the rotor 9. In the same way, as represented again in FIG. 4, the contrast element 92 is brought to the aforementioned second radial distance r2 with respect to the main body 91 when the same contrast element 92 is in the central position β3 of the angular range β, since the thrust exerted progressively by the contrast wall 10 on the same contrast element 92 obstructs and overcomes the thrust exerted by the elastic means 932, causing the contraction of the same telescopic arm 931.

Figure 5:
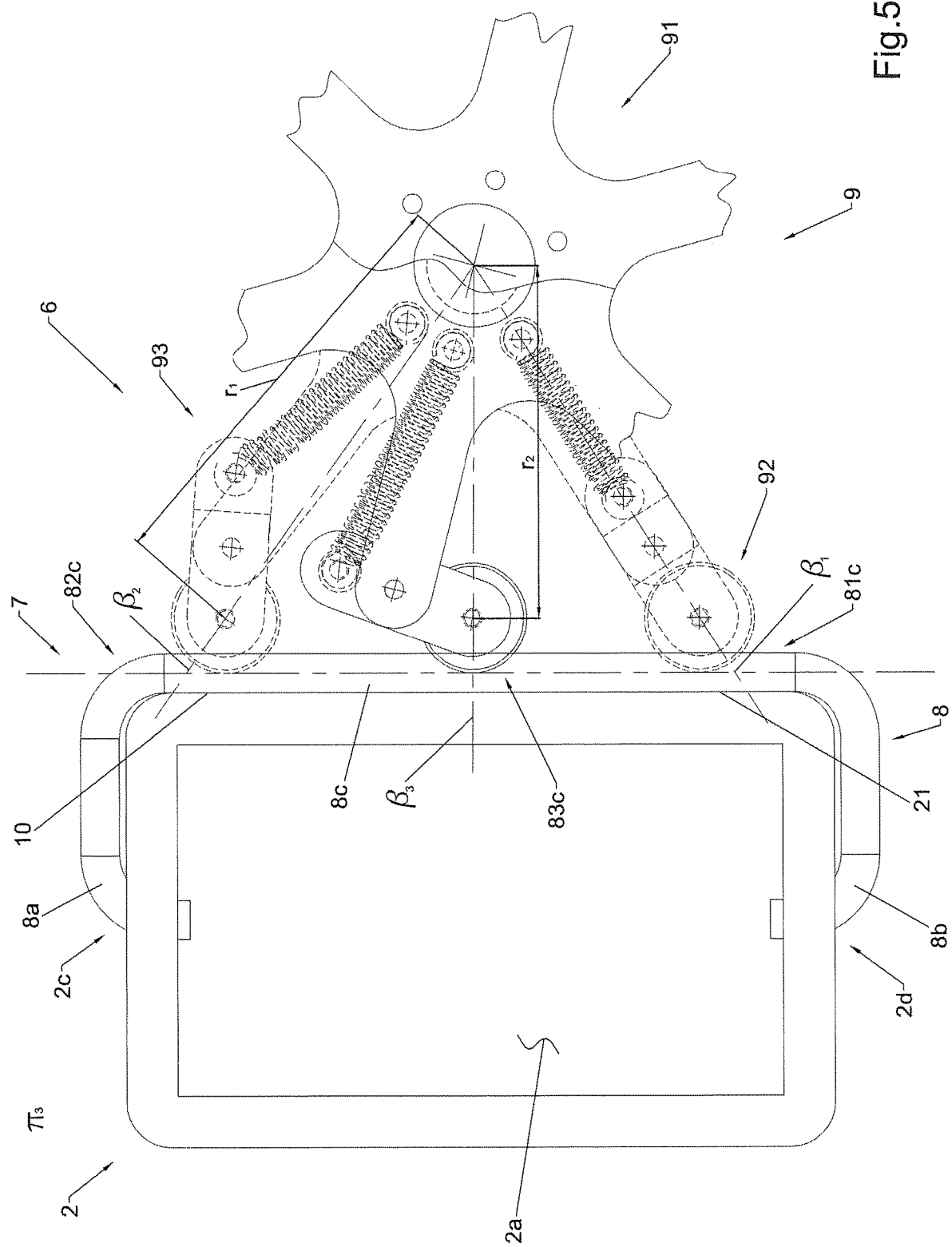
FIG. 5 represents the schematized view from above of a second embodiment of the recirculation circuit provided in the stereolithography machine of the invention according to FIGS. 1 and 2; the figure represents the rotor belonging to the recirculation circuit having a contrast element arranged ideally in different positions with respect to the duct through which the resin flows.
Figure 8:
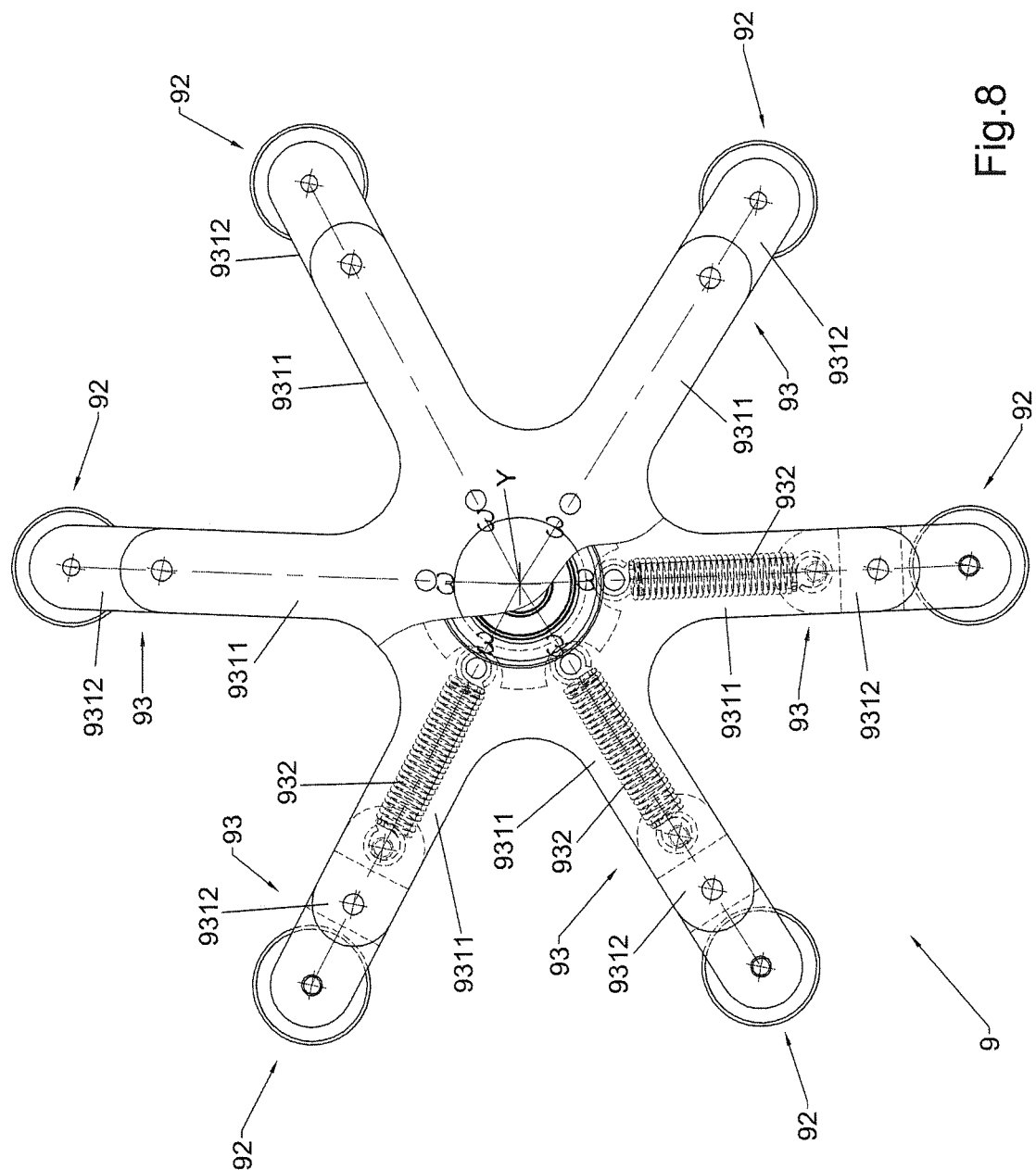
FIG. 8 represents a view from above of the detail of the rotor belonging to the recirculation circuit represented in FIG. 5.

According to a variant embodiment of the one just described, represented in FIGS. 5 and 8, the mechanical group 93 could comprise an articulated arm 931 arranged between the main body 91 and a contrast element 92 and provided with a connecting rod 9311 and with a crank 9312 hinged to one another.

Also in this case, the mechanical group 93 should be provided with elastic means 932 configured to keep, in rest condition, the articulated arm 931 in a position of maximum extension. In the same way as the previous case, therefore, as can be seen in FIG. 5, in the case in which the contrast element 92 is at the ends β1 and β2 of the aforementioned angular range β during the rotation of the rotor 9, the elastic means 932 in cooperation with the articulated arm 931 keep the same contrast element 92 at the aforementioned first radial distance r1. Whereas, as represented again in FIG. 5, when the contrast element 92 is at the central position β3 of the angular range β, it is brought to the aforementioned second radial distance r2 with respect to the main body 91, since the thrust exerted progressively by the contrast wall 10 on the same contrast element 92 obstructs and overcomes the thrust exerted by the elastic means 932, determining the rotation of the connecting rod 9311 with respect to the crank 9312 and therefore the contraction of the articulated arm 931.

Figure 6:
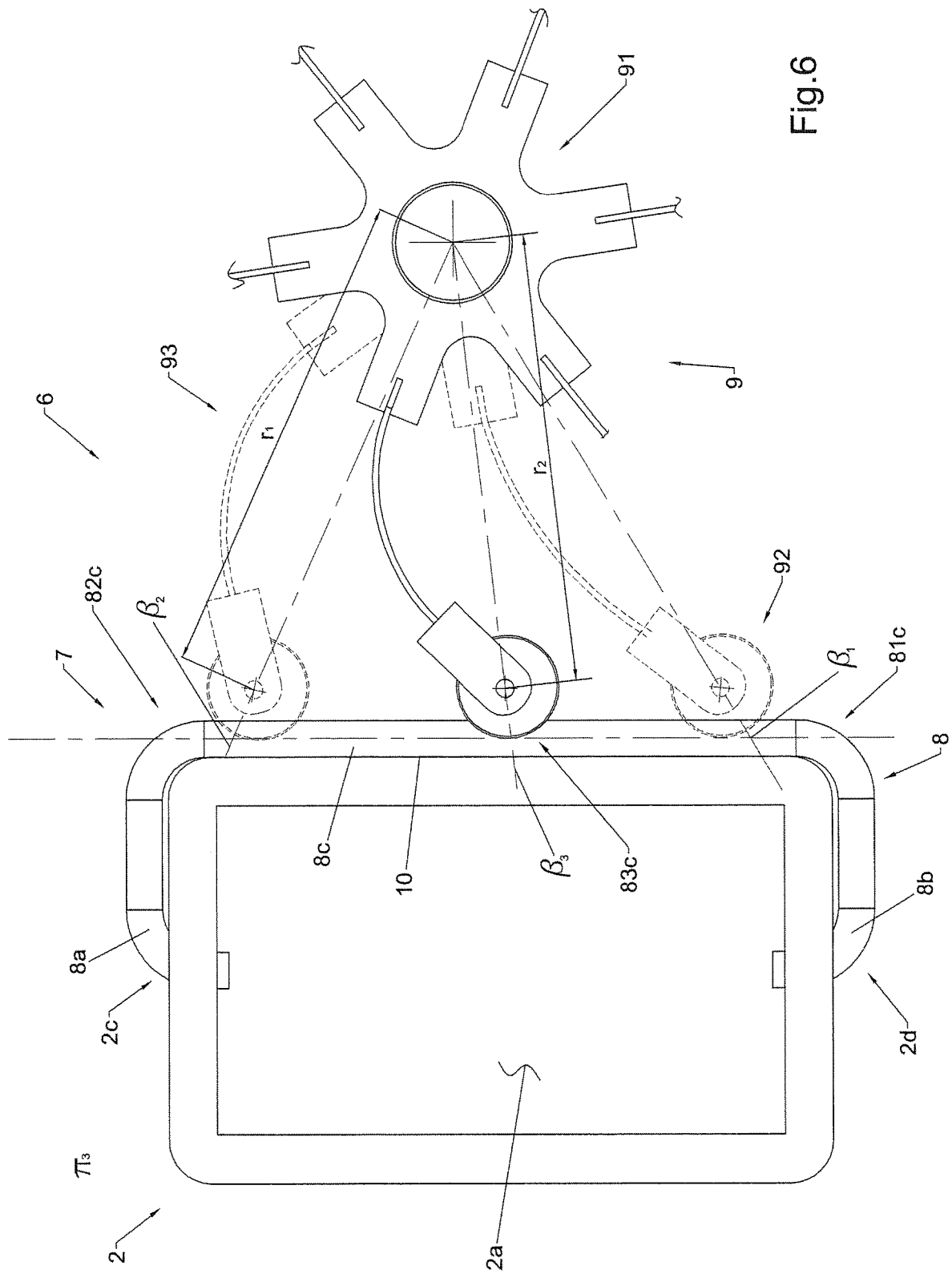
FIG. 6 represents the schematized view from above of a third embodiment of the recirculation circuit provided in the stereolithography machine of the invention according to FIGS. 1 and 2; the figure represents the rotor belonging to the recirculation circuit having a contrast element arranged ideally in different positions with respect to the duct through which the resin flows.
Figure 9:
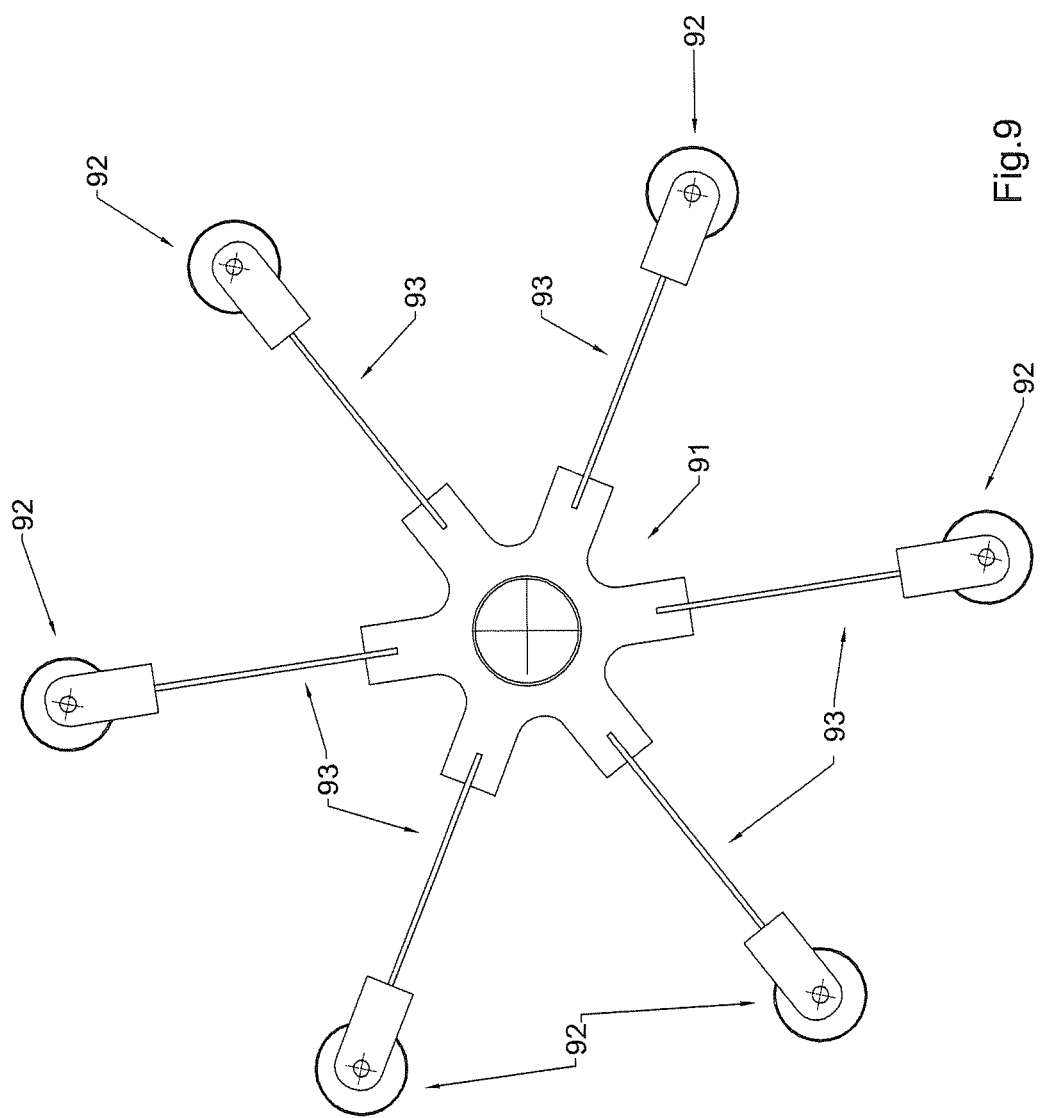
FIG. 9 represents a view from above of the detail of the rotor belonging to the recirculation circuit represented in FIG. 6.

Furthermore, a third variant embodiment, alternative to the two just described, represented in FIGS. 6 and 9, provides that the mechanical group 93 comprises an elastic strip 931 arranged between the main body 91 and a contrast element 92.

In this case, the elastic effect is ensured by the same strip 931 which is thus configured so that, in rest condition, it keeps the contrast element 92 in a position of maximum distance from the main body 91. In the same way as the previous cases, therefore, as can be seen in FIG. 6, in the case in which the contrast element 92 is at the ends β1 and β2 of the aforementioned angular range β during the rotation of the rotor 9, the strip 931 keeps the same contrast element 92 at the aforementioned first radial distance r1. Whereas, as represented again in FIG. 6, when the contrast element 92 is at the central position β3 of the angular range β, it is brought to the aforementioned second radial distance r2 with respect to the main body 91, since the thrust exerted progressively by the contrast wall 10 on the same contrast element 92 obstructs and overcomes the thrust exerted by the aforementioned elastic strip 931.

Figure 10:
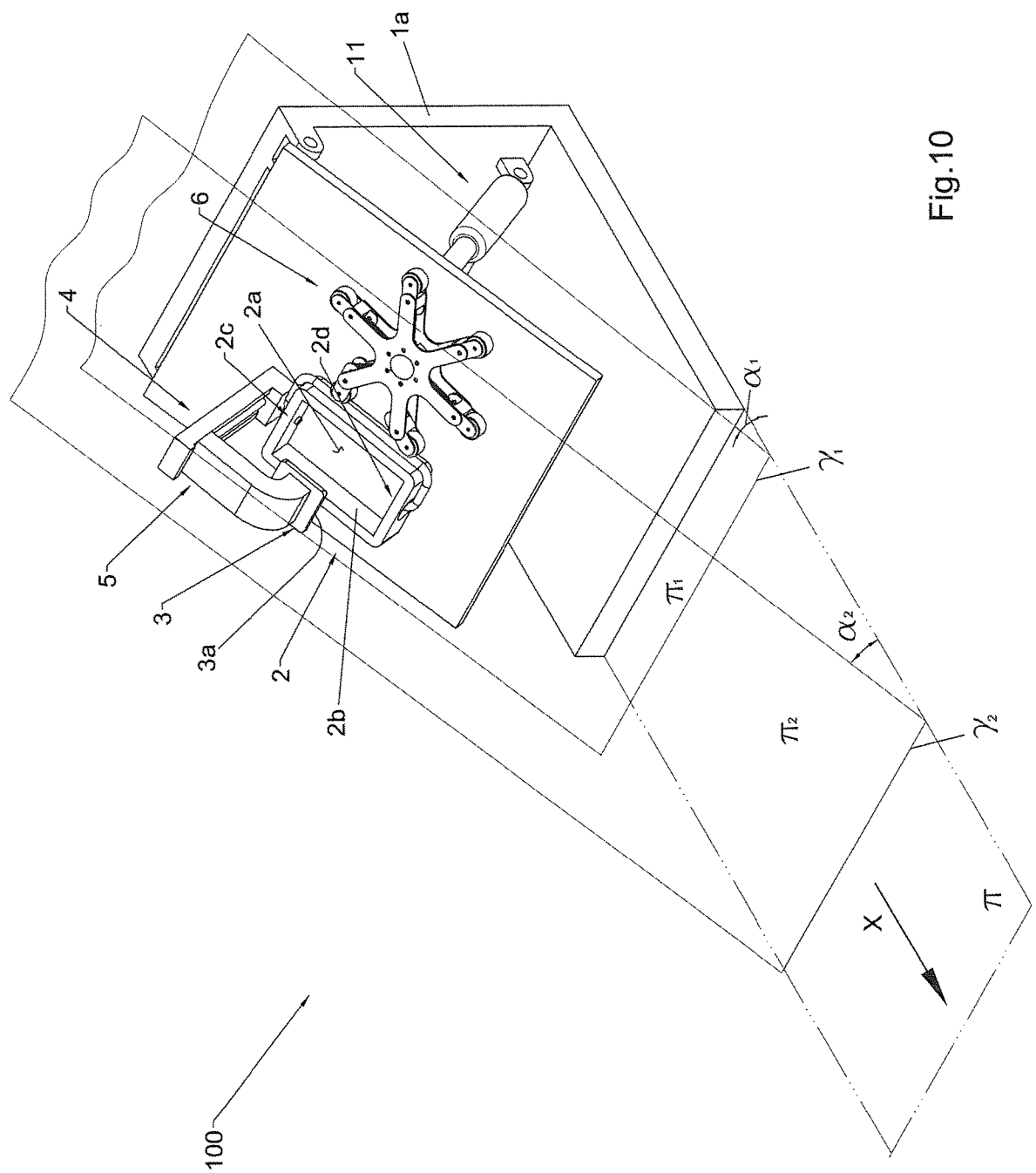
FIG. 10 represents a schematized axonometric view of a second embodiment of the stereolithography machine of the invention.
Figure 11:
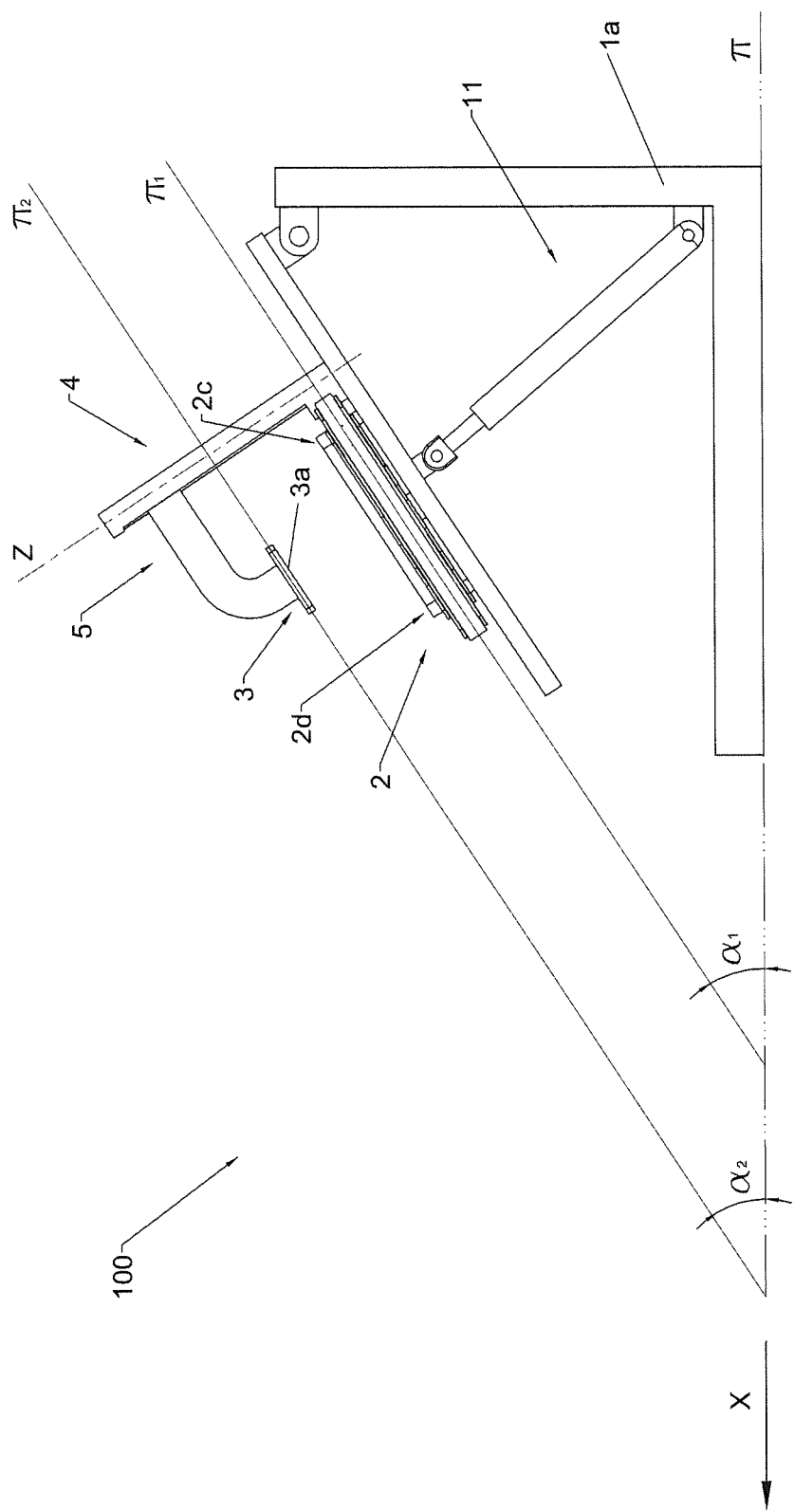
FIG. 11 represents the schematized side view of the second embodiment of the stereolithography machine of the invention.

A second preferred embodiment of the stereolithography machine of the invention is represented as a whole in FIGS. 10 and 11 where it is wholly indicated with 100.

Such a second embodiment of the stereolithography machine 100 of the invention has all of the characteristics described for the aforementioned first embodiment, including the possible variants, except for what will be outlined shortly. For this reason, for the sake of simplicity all of the shared characteristics of the two embodiments will not be described again and, moreover, for shared structural elements the same reference numerals in the aforementioned figures will be used.

With regard to the difference between the aforementioned two preferred embodiments of the invention, it concerns the fact that for the stereolithography machine 100, unlike the previous one, the tank 2, the support group 5 and the modelling plate 3 can be coupled with the support structure 1a through inclination means or actuator 11 configured so as to vary the value of the angles of intersection α1 and α2, between the condition of execution of the stereolithography process and the rest condition of the same stereolithography machine 100 and vice-versa.

In particular, such a stereolithography machine 100 could provide that the inclination means or actuator 11 are configured, during the configuration and setting operations which precede the actual stereolithography process, to arrange the tank 2, the support group 5 and the modelling plate 3 so that the bottom 2a and the modelling surface 3a are substantially arranged in horizontal and parallel position to the support plane π. Such a position allows the operator, advantageously, to intervene on the stereolithography machine 100, for example for the insertion of the tank 2 in the aforementioned housing, in a quicker and easier manner with respect to what is possible with the first embodiment of the invention described above.

The stereolithography machine 100 according to such a second preferred embodiment also provides that the inclination means or actuator 11 are configured to vary the position of the tank 2, of the support group 5 and of the modelling plate 3 with respect to the support structure 1a so as to modify the angles of intersection α1 and α2 from the rest condition to the execution condition of the aforementioned stereolithography process. It is also provided to keep such an inclination of the bottom 2a and of the modelling surface 3a with respect to the support plane π for the entire duration of the stereolithography process.

Preferably, also in this case, the value of the angles of intersection α1 and α2 during the stereolithography process is defined in the range comprised between ⅛π rad and ⅜π rad, preferably their value is selected around π/4 rad.

In this case, therefore, on the one hand with the stereolithography machine 100 the advantages described earlier are obtained with the use of a bottom 2a and a modelling surface 3a inclined with respect to the support plane π, in the same way as the stereolithography machine 1, and on the other hand in the configuration and setting step of the same stereolithography machine 100 the interventions of the operator are made easier.

Based on what has been stated, therefore, the stereolithography machine of the invention achieves all of the predetermined purposes.

In particular, it achieves the purpose of making a stereolithography machine that makes it possible to produce a three-dimensional object through solidification in layers of a liquid substance more quickly with respect to the stereolithography machines of the prior art, with the same structural complexity of some types of stereolithography machines of the prior art.

It also achieves the purpose of making a stereolithography machine that has a simpler structure with respect to some types of stereolithography machines of the prior art, for the same time required for the production of the same three-dimensional object.

A further purpose that is accomplished is making a stereolithography machine that makes it possible to use a smaller amount of resin with respect to the amount of resin required with the use of the stereolithography machines of the prior art.

The invention claimed is:

1. A stereolithography machine comprising:
a support structure adapted to be arranged resting on a substantially horizontal support plane having a reference direction;
a tank coupled with said support structure and provided with a bottom for containing a photosensitive liquid substance;
a support group coupled with said support structure through a movement means, the movement means configured for moving said support group above said tank in a movement direction substantially perpendicular to said bottom;
a modelling plate connected to said support group so that a modelling surface of said modelling plate faces, substantially in parallel position, said bottom to support a three-dimensional object; wherein the stereolithography machine is configured in such a way that at least during a stereolithography process for producing said three-dimensional object, during an operating condition, wherein said tank, said support group and said modelling plate are coupled with said support structure so that said bottom and said modelling surface lie on planes intersecting said support plane, during the operating condition; said planes and said support plane define angles of intersection α1 and α2, respectively, and lines of intersection, respectively, which are orthogonal to said reference direction; wherein said tank is provided with a recirculation circuit configured to move said photosensitive liquid substance contained in said tank from a first end to a second end of said tank, both defined along said reference direction, to carry out inside the tank, during the stereoliithoqraphy process, a continuous recirculation of the resin that, by gravity, flows out from the first end at a first height, to the second end at a second height lower than the first height, and the same resin is again brought by the recirculation circuit from the second end to the first end.

2. The stereolithography machine according to claim 1 wherein at least during said stereolithography process said angles of intersection α1 and α2 is comprised between π/8 and π/3 rad.

3. The stereolithography machine according to claim 1, wherein in said tank said support group and said modelling plate are coupled with said support structure so that the value of said angles of intersection α1 and α2 is predetermined and remains unchanged both during said stereolithography process and in rest conditions of said stereolithography machine.

4. The stereolithography machine according to claim 1 wherein said recirculation circuit comprises a peristaltic pump provided with:
a duct made of deformable material arranged outside of said tank and having a first mouth and a second mouth in fluid-dynamic communication with said tank respectively at one of said ends and the other of said ends, said duct having at least one segment arranged close to a contrast wall;
a rotor provided with a main body at the center of which a rotation axis is defined and at the periphery of which at least one contrast element is coupled that can touch and throttle said at least one segment of said duct on the opposite side with respect to said contrast wall so as to throttle, in cooperation with said contrast wall, said at least one segment for a portion of an angular range during the rotation of said rotor.

5. The stereolithography machine according to claim 4, wherein said rotation axis of said rotor is defined substantially orthogonal to the lying plane of said duct so that said at least one contrast element touches and progressively throttles said at least one segment for the entire said angular range during the rotation of said rotor.

6. The stereolithography machine according to claim 5, wherein:
said at least one segment of said duct and said contrast wall have a substantially rectilinear development in a position parallel and adjacent to one another;
said rotor comprises a mechanical group arranged between said main body and said at least one contrast element, said mechanical group being configured to allow the variation of the radial distance between said at least one contrast element and said main body so as to allow said contrast element to touch and progressively throttle said at least one rectilinear development of said duct for the entire said angular range during said rotation of said rotor.

7. The stereolithography machine according to claim 6, wherein said mechanical group comprises:
a telescopic arm arranged between said main body and said at least one contrast element;
elastic means configured to keep, in rest condition, said telescopic arm in the position of maximum extension.

8. The stereolithography machine according to claim 6, wherein said mechanical group comprises:

an articulated arm provided with a connecting rod and a crank hinged to one another, said articulated arm being arranged between said main body and said at least one contrast element;

elastic means configured to keep, in rest condition, said articulated arm in a position of maximum extension.

9. The stereolithoqraphy machine according to claim 4, wherein said at least one contrast element comprises a plurality of contrast elements arranged at the periphery of said main body, each of said contrast elements being spaced from the contrast elements adjacent to it by the same predetermined angular distance.

10. The stereolithography machine according to claim 4, wherein said rotor is able to be set in rotation in the direction that allows said photosensitive liquid substance to flow through said duct from the end of said tank defined close to said line of intersection between the plane on which said bottom lies and said support plane to the end of said tank defined in distal position with respect to said line of intersection along said reference direction.

11. The stereolithography machine according to claim 1, wherein said tank, said support group and said modelling plate are coupled with said support structure through an actuator configured so as to vary the value of said angles of intersection $\alpha 1$ and $\alpha 2$ between the operating condition of said stereolithography process and the rest condition of said stereolithography machine and vice-versa.

\* \* \* \* \*

UNITED STATES PATENT AND TRADEMARK OFFICE
CERTIFICATE OF CORRECTION

PATENT NO. : 11,072,118 B2
APPLICATION NO. : 16/469965
DATED : July 27, 2021
INVENTOR(S) : Sergio Zenere and Renzo Busato It is certified that error appears in the above-identified patent and that said Letters Patent is hereby corrected as shown below:

In the Claims

In Claim 1, at Column 12, Line 2, delete the word "stereolithoqraphy" and insert --stereolithography--, therefor.

In Claim 9, at Column 13, Line 7, delete the word "stereolithoqraphy" and insert --stereolithography--, therefor.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*